United States Patent
Kim et al.

(10) Patent No.: US 8,877,375 B2
(45) Date of Patent: Nov. 4, 2014

(54) AQUEOUS ACTIVE MATERIAL COMPOSITION, ELECTRODE, AND RECHARGEABLE LITHIUM BATTERY USING THE SAME

(75) Inventors: Kwang-Soo Kim, Yongin-si (KR);
Su-Jin Yoon, Yongin-si (KR);
Joong-Woo Nam, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 214 days.

(21) Appl. No.: 13/356,826

(22) Filed: Jan. 24, 2012

(65) Prior Publication Data
US 2012/0237826 A1  Sep. 20, 2012

(30) Foreign Application Priority Data
Mar. 17, 2011  (KR) .................. 10-2011-0023872

(51) Int. Cl.
| | |
|---|---|
| H01M 4/62 | (2006.01) |
| H01M 4/505 | (2010.01) |
| H01M 4/525 | (2010.01) |
| H01M 4/583 | (2010.01) |

(52) U.S. Cl.
USPC ........... 429/217; 429/221; 429/223; 429/224; 429/231.8

(58) Field of Classification Search
USPC ................. 429/217, 231.8, 223, 224, 221
See application file for complete search history.

(56) References Cited

U.S. PATENT DOCUMENTS

| | | | |
|---|---|---|---|
| 6,800,222 B1 | 10/2004 | Noguchi et al. | |
| 7,095,604 B2 | 8/2006 | Noguchi et al. | |
| 7,267,907 B2 | 9/2007 | Kim | |
| 2009/0317722 A1* | 12/2009 | Watanabe | 429/231.95 |
| 2011/0091774 A1* | 4/2011 | Wakizaka et al. | 429/246 |

FOREIGN PATENT DOCUMENTS

| | | |
|---|---|---|
| JP | 11-067213 A | 3/1999 |
| JP | 2001-126966 A | 5/2001 |
| JP | 2002-293987 A | 10/2002 |
| JP | 3689289 B2 | 8/2005 |
| JP | 2008-247927 A | 10/2008 |
| JP | 2010-165493 A | 7/2010 |
| KR | 10-2005-0051306 A | 6/2005 |
| KR | 10-2005-0052217 A | 6/2005 |
| KR | 10 2009-0125254 A | 12/2009 |
| WO | WO 2009049220 A1 * | 4/2009 |

OTHER PUBLICATIONS

Korean Office Action in KR 10-2011-0023872, dated Aug. 27, 2012 (Kim, et al.).

* cited by examiner

*Primary Examiner* — Jonathan Jelsma
(74) *Attorney, Agent, or Firm* — Lee & Morse, P.C.

(57) ABSTRACT

An aqueous active material composition, an electrode, and a rechargeable lithium battery including the same, the aqueous active material composition including an active material; a binder; and a water-soluble cellulose mixture, wherein the water-soluble cellulose mixture includes a first cellulose compound having a degree of substitution of about 0.5 to about 0.9 and a second cellulose compound having a degree of substitution of about 1.1 to about 1.5.

20 Claims, 1 Drawing Sheet

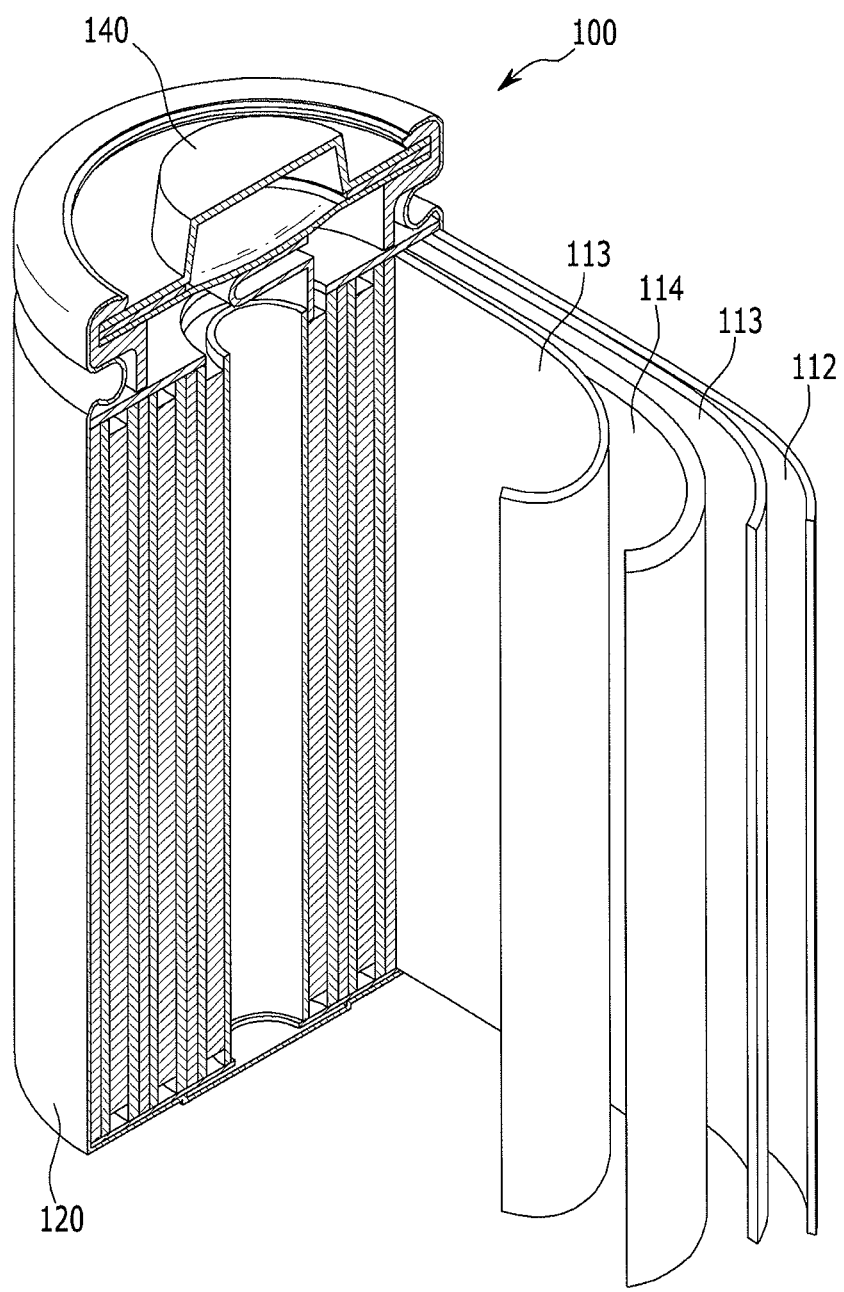

AQUEOUS ACTIVE MATERIAL COMPOSITION, ELECTRODE, AND RECHARGEABLE LITHIUM BATTERY USING THE SAME

BACKGROUND

1. Field

Embodiments relate to an aqueous active material composition, an electrode, and a rechargeable lithium battery using the same.

2. Description of the Related Art

Lithium rechargeable batteries have recently drawn attention as a power source of small portable electronic devices. The batteries use an organic electrolyte solution and thus have about two or more times greater discharge voltage of a conventional battery (that uses an alkali aqueous solution). Accordingly, lithium rechargeable batteries have high energy density.

Positive active materials of the rechargeable lithium batteries may include, e.g., lithium-transition element composite oxides capable of intercalating lithium, such as $LiCoO_2$, $LiMn_2O_4$, $LiNi_{1-x}Co_xO_2$ (0<x<1), and the like. Negative active materials of the rechargeable lithium batteries may include, e.g., various carbon-based materials such as artificial graphite, natural graphite, and hard carbon, which can intercalate and deintercalate lithium ions.

When an electrode of the positive electrode or the negative electrode is formed using the positive active material or the negative active material, a slurry may first be prepared. When using water as a solvent, a cellulose compound, e.g., carboxylmethyl cellulose (CMC), may be used as a binder.

SUMMARY OF THE INVENTION

Embodiments are directed to an aqueous active material composition, an electrode, and a rechargeable lithium battery using the same.

The embodiments may be realized by providing an aqueous active material composition including an active material; a binder; and a water-soluble cellulose mixture, wherein the water-soluble cellulose mixture includes a first cellulose compound having a degree of substitution of about 0.5 to about 0.9, and a second cellulose compound having a degree of substitution of about 1.1 to about 1.5.

The first cellulose compound and the second cellulose compound may each independently include carboxylmethyl cellulose, methyl cellulose, hydroxylethyl cellulose, hydroxypropyl cellulose, or a combination thereof.

A weight ratio of the first cellulose compound to the second cellulose compound may be about 1:99 to about 99:1.

A weight ratio of the first cellulose compound to the second cellulose compound may be about 40:60 to about 60:40.

The active material may be a positive active material or a negative active material.

The active material may be the positive active material, the positive active material including $LiCoO_2$, $LiMn_2O_4$, $LiMnPO_4$, $LiFePO_4$, $LiNiO_2$, $Li(Ni_xCo_yMn_z)O_2$ (x+y+z=1, 0<x, y, z<1), or a combination thereof.

The active material may be the positive active material, the positive active material including $LiNi_xMn_{1-x}O_2$ (0.1≤x≤0.4).

The active material may be the positive active material, the positive active material having an average particle diameter of about 3 μm to about 12 μm.

The active material may be the negative active material, the negative active material including a material that reversibly intercalates/deintercalates lithium ions, a lithium metal, a lithium metal alloy, a material being capable of doping and dedoping lithium, a transition metal oxide, or a combination thereof.

The aqueous active material composition may further include a conductive material, the conductive material including natural graphite, artificial graphite, carbon black, acetylene black, ketjen black, a carbon fiber, a metal powder, a metal fiber, or a combination thereof.

The binder may include a styrene-based latex binder, an acrylate-based binder, or a combination thereof.

The binder may include the styrene-based latex binder, the styrene-based latex binder including a styrene-butadiene rubber, an acrylate-styrene butadiene copolymer rubber, an acrylonitrile-styrene butadiene copolymer rubber, or a combination thereof.

The binder may include the acrylate-based binder, the acrylate-based binder including a methylmethacrylate-lithiummethacrylic acid copolymer, an alkylacrylate-acrylonitrile-acrylic acid copolymer, or a combination thereof.

The aqueous active material composition may include about 84 wt % to about 99 wt % of the active material; about 0.5 wt % to about 3 wt % of the binder; and about 0.5 wt % to about 3 wt % of the water-soluble cellulose mixture.

The embodiments may also be realized by providing an electrode manufactured using the aqueous active material composition of an embodiment.

The electrode may be a positive electrode, the positive electrode having a thickness of about 80 μm to about 250 μm.

The electrode may be a negative electrode, the negative electrode having a resistivity of about 20 Ωm or less.

The resistivity of the negative electrode may be about 0.5 Ωm or less.

The electrode may be a negative electrode, the negative electrode having a thickness of about 50 μm to about 200 μm.

The embodiments may also be realized by providing a rechargeable lithium battery including the electrode of an embodiment.

BRIEF DESCRIPTION OF THE DRAWINGS

The embodiments will become more apparent to those of ordinary skill in the art by describing in detail exemplary embodiments with reference to the attached drawings, in which:

FIG. 1 illustrates an exploded perspective view of a rechargeable lithium battery according to an embodiment.

DETAILED DESCRIPTION

Korean Patent Application No. 10-2011-0023872, filed on Mar. 17, 2011, in the Korean Intellectual Property Office, and entitled: "Aqueous Active Material Composition, Electrode and Rechargeable Lithium Battery Using the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. In addition, it will also be understood that when an element is referred to as being "between" two elements, it can be the only element between the two elements, or one or more intervening elements may also be present. Like reference numerals refer to like elements throughout.

In an cellulose compound, an average number of substituted groups per cellulose repeating unit may be referred to as a degree of substitution (DS). The cellulose compound may have a variable water solubility depending on the degree of substitution. For example, when a cellulose compound has a high degree of substitution, the water solubility thereof may be increased. When the cellulose compound has a low degree of substitution, the water solubility thereof may be decreased. The water solubility of a cellulose compound may affect dispersion properties of an electrode active material composition (slurry). When the water solubility is higher, the dispersion properties of the electrode active material composition may be increased.

According to an embodiment, an aqueous active material composition may include an active material; a binder; and a water-soluble cellulose mixture. For example, the water-soluble cellulose mixture may include a first cellulose compound (having a degree of substitution (DS) of about 0.5 to about 0.9) and a second cellulose compound (having a degree of substitution of about 1.1 to about 1.5).

For example, when the second cellulose compound having a degree of substitution of about 1.1 to about 1.5 is used, the water solubility of the cellulose may increase, thereby improving dispersion properties of inorganic particles (e.g., the active material and a conductive material). Thus, when an electrode is fabricated using the prepared aqueous active material composition, a smooth flow path for current may be formed inside of the electrode. In addition, the adherence of the electrode may be improved when using the first cellulose compound having a degree of substitution of about 0.5 to about 0.9, thereby increasing adsorption strength of the cellulose with respect to the active material particles. As a result, both dispersion properties and adsorption strength of the aqueous active material composition may be increased; and the resistance may be decreased without a loss in the adherence of the electrode, so as to improve the power performance of a rechargeable lithium battery.

When the degree of substitution of the first cellulose compound is about 0.5 to about 0.9, the water solubility may be excellent and thus the first cellulose compound may be effective as an aqueous thickening agent. In addition, affinity for the active material may be excellent and thus the adherence of the electrode plate may be excellent as well.

When the degree of substitution of the second cellulose compound is about 1.1 to about 1.5, the water solubility may increase. Thus, it may be advantageous to include the second cellulose compound when an active material is dispersed (in the preparation of an active material composition) and thus the resistance of an electrode plate may be decreased.

The first cellulose compound and the second cellulose compound may each independently include, e.g., carboxylmethyl cellulose (CMC), methyl cellulose, hydroxylethyl cellulose, hydroxypropyl cellulose, or a combination thereof, but is not limited thereto.

The first cellulose compound and the second cellulose compound may be included in the composition at a weight ratio of about 1:99 to about 99:1. In an implementation, the weight ratio may be about 40:60 to about 60:40. Maintaining the weight ratio of the first cellulose compound to the second cellulose compound within the range may help ensure that the effects of improving dispersion properties and reinforcing the adsorption strength to the active material particles are maximized.

The aqueous active material composition may include the active material in an amount of about 84 wt % to about 99 wt %; the binder in an amount of about 0.5 wt % to about 3 wt %; and the water-soluble cellulose mixture in an amount of about 0.5 wt % to about 3 wt %. When the aqueous active material composition includes about 0.5 wt % to about 3 wt % of the water-soluble cellulose mixture, adherence may be maintained at a level sufficient to secure reliability of the electrode and battery. In addition, the resistance of the electrode may be decreased. Thus, the power of a rechargeable lithium battery may be increased.

The active material may be a positive active material or a negative active material. For example, the aqueous active material composition may be used for fabrication of a positive electrode when the active material is the positive active material. The aqueous active material composition may be used for fabrication of a negative electrode when the active material is the negative active material.

The positive electrode may include a current collector and a positive active material layer on the current collector.

The positive active material may include lithiated intercalation compounds that reversibly intercalate and deintercalate lithium ions. The positive active material may include a composite oxide including at least one of cobalt, manganese, and nickel, as well as lithium. For example, the following lithium-containing compounds may be used, but they are not limited thereto.

$Li_aA_{1-b}R_bD_2$ ($0.90 \leq a \leq 1.8$ and $0 \leq b \leq 0.5$); $Li_aE_{1-b}R_bO_{2-c}D_c$ ($0.90 \leq a \leq 1.8$, $0 \leq b \leq 0.5$ and $0 \leq c \leq 0.05$); $Li_aE_{2-b}R_bO_{4-c}D_c$ ($0.90 \leq a \leq 1.8$, $0 \leq b \leq 0.5$, $0 \leq c \leq 0.05$); $Li_aNi_{1-b-c}Co_bR_cD_\alpha$ ($0.90 \leq a \leq 1.8$, $0 \leq b \leq 0.5$, $0 \leq c \leq 0.05$ and $0 < \alpha \leq 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Co_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cD_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_\alpha$ ($0.90 \leq a \leq 1.8$, $0 \leq b \leq 0.5$, $0 \leq c \leq 0.05$ and $0 < \alpha < 2$); $Li_aNi_{1-b-c}Mn_bR_cO_{2-\alpha}Z_2$ ($0.90 \leq a \leq 1.8$, $0 \leq b \leq 0.5$, $0 \leq c \leq 0.05$ and $0 < \alpha < 2$); $Li_aNi_bE_cG_dO_2$ ($0.90 \leq a \leq 1.8$, $0 \leq b \leq 0.9$, $0 \leq c \leq 0.5$ and $0.001 \leq d \leq 0.1$); $Li_aNi_bCo_cMn_dGeO_2$ ($0.90 \leq a \leq 1.8$, $0 \leq b \leq 0.9$, $0 \leq c \leq 0.5$, $0 \leq d \leq 0.5$ and $0.001 \leq e \leq 0.1$); $Li_aNiG_bO_2$ ($0.90 \leq a \leq 1.8$ and $0.001 \leq b \leq 0.1$); $Li_aCoG_bO_2$ ($0.90 \leq a \leq 1.8$ and $0.001 \leq b \leq 0.1$); $Li_aMnG_bO_2$ ($0.90 \leq a \leq 1.8$ and $0.001 \leq b \leq 0.1$); $Li_aMn_2G_bO_4$ ($0.90 \leq a \leq 1.8$ and $0.001 \leq b \leq 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the above chemical formulae, A may be Ni, Co, Mn, or a combination thereof; R may be Al, Ni, Co, Mn, Cr, Fe, Mg, Sr, V, a rare earth element, or a combination thereof; D may be O, F, S, P, or a combination thereof; E may be Co, Mn, or a combination thereof; Z may be F, S, P, or a combination thereof; G may be Al, Cr, Mn, Fe, Mg, La, Ce, Sr, V, or a combination thereof; Q may be Ti, Mo, Mn, or a combination thereof; T may be Cr, V, Fe, Sc, Y, or a combination thereof; J may be V, Cr, Mn, Co, Ni, Cu, or a combination thereof.

For example, the positive active material may be $LiCoO_2$, $LiMn_2O_4$, $LiMnPO_4$, $LiFePO_4$, $LiNiO_2$, $Li(Ni_xCo_yMn_z)O_2$ ($x+y+z=1$, $0<x, y, z<1$), or $LiNi_xMn_{1-x}O_2$ ($0.1 \leq x \leq 0.4$).

The positive active material may have an average particle diameter of about 3 μm to about 12 μm. Maintaining the average particle diameter of the positive active material at about 3 μm to about 12 μm may help ensure that power performance is doubled due to an increase of a specific surface area.

The positive active material may have a coating layer on a surface thereof or may be mixed with a compound having a coating layer. The coating layer may include a coating element compound including at least one of an oxide of a coating element, a hydroxide of a coating element, an oxyhydroxide of a coating element, an oxycarbonate of a coating element, and a hydroxyl carbonate of a coating element. The compounds for a coating layer may be amorphous or crystalline. The coating element for a coating layer may include, e.g., Mg, Al, Co, K, Na, Ca, Si, Ti, V, Sn, Ge, Ga, B, As, Zr, or a mixture thereof. The coating layer can be formed in a method having no negative influence on properties of a positive active material by including these elements in the compound. For example, the method may include any suitable coating method such as spray coating, dipping, and the like.

The positive active material layer may also include, e.g., a binder and a conductive material.

The binder may improve binding properties of the positive active material particles to each other and to a current collector. The binder may include, e.g., a styrene-based latex binder, an acrylate-based binder, or a combination thereof.

The styrene-based latex binder may include, e.g., a styrene-butadiene rubber (SBR), an acrylate-styrene butadiene copolymer rubber (acrylate-co-SBR), an acrylonitrile-styrene butadiene copolymer rubber (acrylonitrile-co-SBR), or the like.

The acrylate-based binder may include, e.g., a copolymer of methylmethacrylate-lithiummethacrylic acid (P(MMA-co-LiMA)), a copolymer of alkylacrylate-acrylonitrile-acrylic acid (P(alkyl acrylate-co-acrylonitrile-acrylic acid)), or the like.

The conductive material may improve conductivity of an electrode. Any suitable electrically conductive material that does not cause a chemical change may be used, e.g., natural graphite, artificial graphite, carbon black, acetylene black, ketjen black, a carbon fiber, a metal powder or a metal fiber including copper, nickel, aluminum, silver, or the like, or a polyphenylene derivative.

In an implementation, the conductive material may include natural graphite, artificial graphite, carbon black, acetylene black, ketjen black, a carbon fiber, a metal powder, a metal fiber, or a combination thereof. The conductive material may be included in an amount of about 10 wt % or less, based on a total weight of the aqueous active material composition.

The current collector may be, e.g., Al foil, but is not limited thereto.

The positive electrode may have a thickness of about 80 μm to about 250 μm.

The negative electrode may include a current collector and a negative active material layer on the current collector. The negative active material layer may include a negative active material.

The negative active material may include a material that reversibly intercalates/deintercalates lithium ions, a lithium metal, a lithium metal alloy, a material being capable of doping and dedoping lithium, or a transition metal oxide.

The material that reversibly intercalates/deintercalates lithium ions may include a carbon material. The carbon material may be any suitable carbon-based negative active material used in a lithium ion rechargeable battery. Examples of the carbon material may include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, mesophase pitch carbonized products, fired coke, and the like.

Examples of the lithium metal alloy may include lithium and a metal including one of Na, K, Rb, Cs, Fr, Be, Mg, Ca, Sr, Si, Sb, Pb, In, Zn, Ba, Ra, Ge, Al, and Sn.

Examples of the material capable of doping lithium may include Si, $SiO_x$ ($0<x<2$), a Si-Q alloy (where Q is an element including an alkali metal, an alkali-earth metal, group 13 to 16 elements, a group 14 element, a transition element, a rare earth element, or combinations thereof, and is not Si), Sn, $SnO_2$, a Sn—R alloy (where R is an element including an alkali metal, an alkali-earth metal, group 13 to 16 elements, a transition element, a rare earth element, or combinations thereof and is not Sn), or mixtures thereof. At least one of these materials may be mixed with $SiO_2$. The elements Q and R may include Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

Examples of the transition metal oxide may include vanadium oxide, lithium vanadium oxide, and the like.

The negative active material layer may include a binder, and optionally a conductive material. The binder and conductive material may be the same as those described above with respect to the positive electrode.

The current collector may include, e.g., a copper foil, a nickel foil, a stainless steel foil, a titanium foil, a nickel foam, a copper foam, a polymer substrate coated with a conductive metal, or combinations thereof.

The negative electrode may have a thickness of about 50 μm to about 200 μm.

Rechargeable lithium batteries may include, e.g., lithium ion batteries, lithium ion polymer batteries, and lithium polymer batteries, according to the presence of a separator and the kind of electrolyte used in the battery. The rechargeable lithium batteries may have a variety of shapes and sizes, and may include cylindrical, prismatic, or coin-type batteries, and may be thin film batteries or may be rather bulky in size. Structures and fabricating methods for lithium ion batteries pertaining to this disclosure are well known in the art.

FIG. 1 illustrates an exploded perspective view of a rechargeable lithium battery according to an embodiment. Referring to FIG. 1, the rechargeable lithium battery 100 may have a cylindrical shape and may include a negative electrode 112, a positive electrode 114, a separator 113 (between the negative electrode 112 and the positive electrode 114), an electrolyte solution (not shown) (e.g., impregnated in the negative electrode 112, the positive electrode 114 and the separator 113), a battery case 120, and sealing member 140 (sealing the battery case 120). The rechargeable lithium battery 100 may be fabricated by sequentially stacking the negative electrode 112, the positive electrode 114, and the separator 113, and spiral-winding them and housing the wound product in the battery case 120.

The negative and positive electrodes may be fabricated by a method including mixing the active material, a conductive material, and a binder into an active material composition; and coating the composition on a current collector.

The electrolyte may include a non-aqueous organic solvent and a lithium salt.

The non-aqueous organic solvent may serve as a medium for transferring ions taking part in the electrochemical reaction of a battery.

The non-aqueous organic solvent may include, e.g., a carbonate-based, an ester-based, an ether-based, a ketone-based, an alcohol-based, or an aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. Examples of the ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and the like. Examples of the ether-based solvent may include dibutyl ether, tetraglyme, diglyme, dimethoxyethane, 2-methyltetrahydrofuran, tetrahydrofuran or the like, and examples of the ketone-based solvent include cyclohexanone, or the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon moiety and may include a double bond, an aromatic ring, or an ether bond), amides such as dimethylformamide, dioxolanes such as 1,3-dioxolane, sulfolanes, or the like.

The non-aqueous organic solvent may be used singularly or in a mixture. When the organic solvent is used in a mixture, a mixture ratio may be controlled in accordance with a desirable battery performance.

The carbonate-based solvent may include a mixture of a cyclic carbonate and a chain carbonate. The cyclic carbonate and the chain carbonate are mixed together in the volume ratio of about 1:1 to about 1:9. When the mixture is used as an electrolyte, the electrolyte performance may be enhanced.

In addition, the non-aqueous organic electrolyte may further include mixtures of carbonate-based solvents and aromatic hydrocarbon-based solvents. The carbonate-based solvents and the aromatic hydrocarbon-based solvents may be mixed together in the volume ratio of about 1:1 to about 30:1.

The aromatic hydrocarbon-based organic solvent may include an aromatic hydrocarbon-based compound represented by the following Chemical Formula 1.

[Chemical Formula 1]

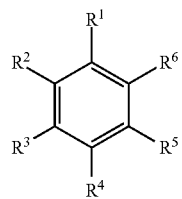

In Chemical Formula 1, $R^1$ to $R^6$ may each independently include hydrogen, a halogen, a C1 to C10 alkyl group, a C1 to C10 haloalkyl group, or a combination thereof.

The aromatic hydrocarbon-based organic solvent may include, e.g., benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

The non-aqueous electrolyte may further include an additive, e.g., vinylene carbonate or an ethylene carbonate-based compound of the following Chemical Formula 2.

[Chemical Formula 2]

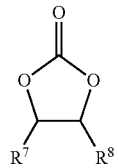

In Chemical Formula 2, $R^7$ and $R^8$ may each independently include hydrogen, a halogen, a cyano (CN) group, a nitro ($NO_2$) group, $NO_2$, and a C1 to C5 fluoroalkyl group, provided that at least one of $R_7$ and $R_8$ includes a halogen, a cyano (CN) group, a nitro ($NO_2$) group, or a C1 to C5 fluoroalkyl, and a C1 to C5 fluoroalkyl group.

Examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. The amount of the additive (used for improving cycle life) may be adjusted within an appropriate range.

The lithium salt may supply lithium ions in the battery, may facilitate a basic operation of a rechargeable lithium battery, and may improve lithium ion transportation between positive and negative electrodes. Examples of the lithium salt may include a supporting salt, e.g., $LiPF_6$, $LiBF_4$, $LiSbF_6$, $LiAsF_6$, $LiC_4F_9SO_3$, $LiClO_4$, $LiAlO_2$, $LiAlCl_4$, $LiN$ $LiN(C_xF_{2x+1}SO_2)(C_yF_{2y+1}SO_2)$, (where x and y are natural numbers), LiCl, LiI, $LiB(C_2O_4)_2$ (lithium bisoxalato borate, LiBOB), or a combination thereof. The lithium salt may be used in a concentration of about 0.1 M to about 2.0 M. Maintaining the concentration of the lithium salt at about 0.1 M to about 2.0 M may help ensure that electrolyte performance and lithium ion mobility are enhanced due to optimal electrolyte conductivity and viscosity.

The rechargeable lithium battery may further include a separator between the negative electrode and the positive electrode, as desired. Examples of suitable separator materials may include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

The following Examples and Comparative Examples are provided in order to set forth particular details of one or more embodiments. However, it will be understood that the embodiments are not limited to the particular details described. Further, the Comparative Examples are set forth to highlight certain characteristics of certain embodiments, and are not to be construed as either limiting the scope of the invention as exemplified in the Examples or as necessarily being outside the scope of the invention in every respect.

(Fabrication of Negative Electrode Using Aqueous Active Material Composition)

Example 1

An aqueous active material composition for a negative electrode was prepared to reach a total weight of 1,000 g by mixing 97.5 wt % of natural graphite (as a negative active material), 1.5 wt % of styrene-butadiene rubber (as a binder), 0.3 wt % of carboxylmethyl cellulose having a degree of substitution of 0.7 (as a first cellulose compound), and 0.7 wt % of carboxylmethyl cellulose having a degree of substitution of 1.3 (as a second cellulose compound) in 500 g of water.

A negative electrode was fabricated by coating Cu foil with the aqueous active material composition for a negative electrode, drying it, and compressing it. The negative electrode had a thickness of about 95 μm.

Example 2

A negative electrode having a thickness of about 95 μm was fabricated according to the same method as Example 1, except that 0.5 wt % of the carboxylmethyl cellulose having a degree of substitution of 0.7 was used as the first cellulose compound and 0.5 wt % of the carboxylmethyl cellulose having a degree of substitution of 1.3 was used as the second cellulose compound, instead of the 0.3 wt % of the carboxylmethyl cellulose having a degree of substitution of 0.7 as the first cellulose compound and the 0.7 wt % of carboxylmethyl cellulose having the degree of substitution of 1.3 as the second cellulose compound.

Example 3

A negative electrode thickness of about 95 μm was fabricated according to the same method as Example 1, except that 0.7 wt % of the carboxylmethyl cellulose having a degree of substitution of 0.7 was used as the first cellulose compound and 0.3 wt % of the carboxylmethyl cellulose having a degree of substitution of 1.3 was used as the second cellulose compound, instead of the 0.3 wt % of the carboxylmethyl cellulose having a degree of substitution of 0.7 as the first cellulose compound and the 0.7 wt % of carboxylmethyl cellulose having the degree of substitution of 1.3 as the second cellulose compound.

Comparative Example 1

A negative electrode thickness of about 95 μm was fabricated according to the same method as Example 1, except that 1.0 wt % of the carboxylmethyl cellulose having a degree of substitution of 0.7 was used as the first cellulose compound and the second cellulose compound was omitted.

Comparative Example 2

A negative electrode thickness of about 95 μm was fabricated according to the same method as Example 1, except that the first cellulose compound was omitted and 1.0 wt % of the carboxylmethyl cellulose having a degree of substitution of 1.3 was used as the second cellulose compound.

(Evaluation 1; Resistivity of Negative Electrode)

Resistivities of the negative electrodes fabricated according to Examples 1 to 3 and Comparative Examples 1 and 2 were measured by measuring sheet resistances of the negative electrodes with an LCR meter (Agilent 4284A) and then multiplying the measured sheet resistance values by the thickness of an electrode. The resistivity measurement results are presented in the following Table 1, based on the value of Comparative Example 1 taken as a reference of 100%.

(Evaluation 2; Adhesion Strength of Negative Electrode)

One side of double-sided adhesive tape was put onto each of the negative electrode fabricated according to Examples 1 to 3 and Comparative Examples 1 and 2. The other side of the adhesive tape was put onto a 1 cm-thick glass. Then, the adhesive tape and each electrode were placed at an angle of 180° on a peeling surface in UTM (Instron 3345); and the adhesion strength was measured through a 180° adhesion strength measurement method. The measurement results are presented in the following Table 1, based on the value of Comparative Example 1 taken as a reference of 100%.

(Fabrication of Rechargeable Lithium Battery Cell)

A positive active material slurry was prepared by mixing $Li(Ni_{0.5}Co_{0.2}Mn_{0.3})O_2$ as a positive active material, polyvinylidene fluoride as a binder, and carbon black (super-P) as a conductive material at a weight ratio of 92:4:4 in the presence of N-methylpyrrolidone. A positive electrode was fabricated by coating an aluminum foil current collector with the positive active material slurry, drying it, and compressing it. The positive electrode had a thickness of about 100 μm.

An electrolyte solution was prepared by dissolving $LiPF_6$ in a solvent (prepared by uniformly mixing ethylene carbonate:ethylmethyl carbonate:diethyl carbonate at a volume ratio of 3:4:3) in a concentration of 1.15 M.

The negative electrodes of Examples 1 to 3 and Comparative Examples 1 and 2 and the positive electrodes prepared in the above-described method were wound and compressed with a polyethylene separator and then inserted into a battery (18650 cell) case. Subsequently, the lithium ion battery cells of Examples 1 to 3 and Comparative Examples 1 and 2 were fabricated by implanting the electrolyte solution thereto.

(Evaluation 3; Resistance of Battery Cells)

The battery cells fabricated using the negative electrodes of Examples 1 to 3 and Comparative Examples 1 and 2 were maintained in a 50% charged state (SOC) by using a charge and discharge device, and then DC-IR during 10-second power at 25° C. were measured. The results are presented in the following Table 1, based on the value of Comparative Example 1 taken as a reference of 100%.

TABLE 1

| | Resistivity of negative electrode [%] | Adherence of negative electrode [%] | Resistance of Battery cell (DC-IR, %) |
|---|---|---|---|
| Example 1 | 69 | 92 | 80 |
| Example 2 | 80 | 95 | 85 |
| Example 3 | 88 | 100 | 90 |
| Comparative Example 1 | 100 | 100 | 100 |
| Comparative Example 2 | 65 | 53 | 120 |

When the adherence of the negative electrode was maintained at a level of 90% or more (0.5 gf/mm or more), the electrode was prevented from peeling in compressing and cutting processes. Also, as the resistivity of the electrode became smaller, e.g., to a level of 80% or lower (0.5 Ωm or lower), the power of the battery cell was improved, which means the resistance of the battery cell was decreased.

The rechargeable lithium battery cell fabricated according to Example 1 (where the resistivity of the negative electrode was improved) showed a resistance of about 20% lower than that of Comparative Example 1. Thus, the power of the battery resistance was improved. In Comparative Example 2, the resistivity of the electrode was the lowest, but the adherence was so low that during the fabrication of a battery cell, the resistance of the battery cell was rather increased due to the peeling of the electrode plate resulting from the impregnation in the electrolyte solution. Thus, the power was decreased.

By way of summation and review, carboxylmethyl cellulose may have three or less carboxylmethyl groups per cellulose repeating unit. Power performance of a rechargeable lithium battery may depend on resistance characteristics of the rechargeable lithium battery. The resistance characteristic may be greatly affected by the dispersion state of the materials inside of a positive active material layer or a negative active material layer. When the active material, conductive material, and binder of an active material layer are not dispersed (but rather agglomerated), channels through which current may flow in the inside of an electrode may not be locally formed, thus increasing resistance inside the rechargeable lithium battery, or the current may concentrate, thus deteriorating performance and stability of the rechargeable lithium battery. Aqueous active material compositions may use a type of carboxylmethyl cellulose having a uniform degree of substitution.

However, according to an embodiment, the cellulose compound mixture may have excellent dispersion properties of an active material, a conductive material, and a binder, thereby improving the performance of a rechargeable lithium battery. When the cellulose compound having a higher degree of substitution is used in conjunction with a cellulose compound having a lower degree of substitution, reactivity between an active material and the carboxylmethyl cellulose may be maintained, and an adverse side effects of deteriorated adherence to an electrode may be avoided. Accordingly, the embodiments simultaneously satisfy the dispersion properties and the adherence characteristic of the aqueous active material composition.

Embodiments provide an aqueous active material composition having excellent dispersion properties and adsorption strength.

Another embodiment provides an electrode manufactured using the aqueous active material composition, and having low resistance and excellent adherence.

Another embodiment provides a rechargeable lithium battery including the electrode and having excellent power performance.

The embodiments provide an aqueous active material composition that has excellent dispersion property and adsorption strength, an electrode which is fabricated using the aqueous active material composition and has small resistance and excellent adherence, and a rechargeable lithium battery having fine power characteristics.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An aqueous active material composition, comprising:
    an active material;
    a binder; and
    a water-soluble cellulose mixture,
    wherein the water-soluble cellulose mixture includes:
        a first cellulose compound having a degree of substitution of about 0.5 to about 0.9, and
        a second cellulose compound having a degree of substitution of about 1.1 to about 1.5, and
    wherein a weight ratio of the first cellulose compound to the second cellulose compound is 50:50 to about 99:1.

2. The aqueous active material composition as claimed in claim 1, wherein the first cellulose compound and the second cellulose compound each independently include carboxylmethyl cellulose, methyl cellulose, hydroxylethyl cellulose, hydroxypropyl cellulose, or a combination thereof.

3. The aqueous active material composition as claimed in claim 1, wherein a weight ratio of the first cellulose compound to the second cellulose compound is 50:50 to about 60:40.

4. The aqueous active material composition as claimed in claim 1, wherein the active material is a positive active material or a negative active material.

5. The aqueous active material composition as claimed in claim 4, wherein the active material is the positive active material, the positive active material including $LiCoO_2$, $LiMn_2O_4$, $LiMnPO_4$, $LiFePO_4$, $LiNiO_2$, $Li(Ni_xCo_yMn_z)O_2$ ($x+y+z=1$, $0<x, y, z<1$), or a combination thereof.

6. The aqueous active material composition as claimed in claim 4, wherein the active material is the positive active material, the positive active material including $LiNi_xMn_{1-x}O_2$ ($0.1 \leq x \leq 0.4$).

7. The aqueous active material composition as claimed in claim 4, wherein the active material is the positive active material, the positive active material having an average particle diameter of about 3 μm to about 12 μm.

8. The aqueous active material composition as claimed in claim 4, wherein the active material is the negative active material, the negative active material including a material that reversibly intercalates/deintercalates lithium ions, a lithium metal, a lithium metal alloy, a material being capable of doping and dedoping lithium, a transition metal oxide, or a combination thereof.

9. The aqueous active material composition as claimed in claim 1, further comprising a conductive material, the conductive material including natural graphite, artificial graphite, carbon black, acetylene black, ketjen black, a carbon fiber, a metal powder, a metal fiber, or a combination thereof.

10. The aqueous active material composition as claimed in claim 1, wherein the binder includes a styrene-based latex binder, an acrylate-based binder, or a combination thereof.

11. The aqueous active material composition as claimed in claim 10, wherein the binder includes the styrene-based latex binder, the styrene-based latex binder including a styrene-butadiene rubber, an acrylate-styrene butadiene copolymer rubber, an acrylonitrile-styrene butadiene copolymer rubber, or a combination thereof.

12. The aqueous active material composition as claimed in claim 10, wherein the binder includes the acrylate-based binder, the acrylate-based binder including a methylmethacrylate-lithiummethacrylic acid copolymer, an alkylacrylate-acrylonitrile-acrylic acid copolymer, or a combination thereof.

13. The aqueous active material composition as dammed in claim 1, wherein the aqueous active material composition includes:
    about 84 wt % to about 99 wt % of the active material;
    about 0.5 wt % to about 3 wt % of the binder; and
    about 0.5 wt % to about 3 wt % of the water-soluble cellulose mixture.

14. An electrode manufactured using the aqueous active material composition as claimed in claim 1.

15. The electrode as claimed in claim 14, wherein the electrode is a positive electrode, the positive electrode having a thickness of about 80 μm to about 250 μm.

16. The electrode as claimed in claim 14, wherein the electrode is a negative electrode, the negative electrode having a resistivity of about 20 Ωm or less.

17. The electrode as claimed in claim 16, wherein the resistivity of the negative electrode is about 0.5 Ωm or less.

18. The electrode as claimed in claim 14, wherein the electrode is a negative electrode, the negative electrode having a thickness of about 50 μm to about 200 μm.

19. A rechargeable lithium battery comprising the electrode as claimed in claim 14.

20. The aqueous active material composition as claimed in claim 1, wherein the first cellulose compound and the second cellulose compound are both a carboxylmethyl cellulose compound, both a methyl cellulose compound, both a hydroxylethyl cellulose compound, or both a hydroxypropyl cellulose compound.

* * * * *